(12) United States Patent
Xu

(10) Patent No.: US 11,738,287 B2
(45) Date of Patent: Aug. 29, 2023

(54) HIGH-PERFORMANCE SEAFLOOR FLEXIBLE OIL STORAGE SYSTEM

(71) Applicant: Petroliam Nasional Berhad (20076-K), Kuala Lumpur (MY)

(72) Inventor: Liangbiao Xu, Shanghai (CN)

(73) Assignee: Petroliam Nasional Berhad (20076-K), Kuala Lumpur (MY)

( * ) Notice: Subject to any disclaimer, the term of this patent is extended or adjusted under 35 U.S.C. 154(b) by 0 days.

(21) Appl. No.: 16/621,739

(22) PCT Filed: May 21, 2018

(86) PCT No.: PCT/CN2018/087628
§ 371 (c)(1),
(2) Date: Dec. 12, 2019

(87) PCT Pub. No.: WO2018/228136
PCT Pub. Date: Dec. 20, 2018

(65) Prior Publication Data
US 2021/0138363 A1 May 13, 2021

(30) Foreign Application Priority Data

Jun. 12, 2017 (CN) .......................... 201720678807.X

(51) Int. Cl.
*B01D 17/12* (2006.01)
*B65D 90/50* (2019.01)
(Continued)

(52) U.S. Cl.
CPC ............. *B01D 17/12* (2013.01); *B01D 17/02* (2013.01); *B65D 88/78* (2013.01); *B65D 90/02* (2013.01);
(Continued)

(58) Field of Classification Search
CPC ........... B01D 17/12; B01D 17/02; F17D 1/14; F17D 3/01; B65D 88/78
See application file for complete search history.

(56) References Cited

U.S. PATENT DOCUMENTS 3,654,951 A    4/1972  Pogonowski et al.
4,351,623 A *  9/1982  Heinz ................... E21B 43/36
                                                          405/210

(Continued)

FOREIGN PATENT DOCUMENTS

CN    101027231 A    8/2007
CN    101672176 A    3/2010
(Continued)

OTHER PUBLICATIONS

Duan, CN205470829, Flexible underwater storaga tank, translation (Year: 2016).*
(Continued)

*Primary Examiner* — Bradley R Spies
*Assistant Examiner* — Jeannie McDermott
(74) *Attorney, Agent, or Firm* — Head, Johnson, Kachigian & Wilkinson, PC

(57) ABSTRACT

A high-performance seafloor flexible oil storage system, solving the existing problems of high storage cost and difficult maintenance of crude oil in offshore oilfields, comprises, sequentially connected, an oil-water separator, a pressure pump, and an input riser extending downward below the sealevel; and a pipeline and multiple flexible oil storage tanks having the same structure with each communicated therewith through a control valve are arranged below the sealevel. One end of the pipeline is communicated with the input riser through a blocking valve and an input valve, and the other end further sequentially connected with an outlet booster pump, an output valve, and an output riser extending upwards above the sealevel and connected to a
(Continued)

tanker through a cooler and an output pump. The flexible oil storage tank has a concrete counterweight connected thereunder for fixing it to a seabed. The system has simple structure, convenient maintenance and good practicability.

6 Claims, 2 Drawing Sheets

(51) Int. Cl.
*B01D 17/02* (2006.01)
*B65D 88/78* (2006.01)
*B65D 90/02* (2019.01)
*B65D 90/501* (2019.01)
*F17D 1/14* (2006.01)
*F17D 3/01* (2006.01)

(52) U.S. Cl.
CPC ........... *B65D 90/021* (2013.01); *B65D 90/50* (2013.01); *B65D 90/501* (2013.01); *F17D 1/14* (2013.01); *F17D 3/01* (2013.01)

(56) References Cited

U.S. PATENT DOCUMENTS

| | | |
|---|---|---|
| 2006/0000615 A1 | 1/2006 | Choi |
| 2006/0225633 A1 | 10/2006 | Sameulsen et al. |
| 2009/0208294 A1* | 8/2009 | Yao ..................... E02B 17/021 405/196 |
| 2011/0229071 A1* | 9/2011 | Vincelette ............. E21B 47/135 385/13 |
| 2014/0069821 A1* | 3/2014 | Marcin ..................... C02F 9/00 205/498 |
| 2016/0023843 A1 | 1/2016 | Donahue et al. |
| 2016/0325927 A1* | 11/2016 | Chitwood .............. B65D 88/54 |

FOREIGN PATENT DOCUMENTS

| | | |
|---|---|---|
| CN | 202609060 U | 12/2012 |
| CN | 105501406 A | 4/2016 |
| CN | 205470829 U | 8/2016 |
| CN | 206827385 U | 1/2018 |

OTHER PUBLICATIONS

Huang, CN202609060, Underwater oil storage and outward conveying system used in deep sea, translation (Year: 2012).*
International Search Report, dated Aug. 9, 2018(PCT/CN2018/087628).

* cited by examiner

HIGH-PERFORMANCE SEAFLOOR FLEXIBLE OIL STORAGE SYSTEM

TECHNICAL FIELD

The invention relates to the technical field of storage of crude oil in offshore oil field, in particular to a high-performance seafloor flexible oil storage system.

BACKGROUND ART

The development of offshore oil and gas fields will rapidly develop in the next 10 to 20 years. The storage of crude oil or other chemical liquids in offshore oilfields will be an important part of the future subsea production plant. During the development of long-distance offshore oil fields, a short storage period of 7-10 days is usually required after the seabed crude oil is extracted. As a result, offshore oil storage facilities are essential for the development of long-distance offshore fields, making it more economical to invest oil storage tanks that can unload/fill oil periodically than investing the construction of the submarine pipelines for long-distance transport.

Nowadays, the methods of offshore oil storage mainly include three modes: Floating Storage and Offloading (FSO), underwater concrete gravity storage tank and underwater steel storage tank. The underwater steel storage tank is divided into oil-water hybrid storage tank or oil-water separation tank. Floating Storage and Offloading (FSO) was installed for the first time in 1977 at Castellon Field. Since 1992, due to the extensive demand in the development of independent marginal oil and gas fields and the convenience of use during the sample engineering stage of conventional offshore oil and gas field development, the FSO has been widely recognized by the industry. Underwater oil storage tanks, including concrete gravity storage tanks and steel storage tanks, are stationary oil storage devices that are suitable for large-volume storage needs in shallow-sea oil and gas fields.

However, each of these storage methods has its own drawbacks: For Floating Storage and Offloading (FSO), its capital expenditures and operating costs are high. Fuel consumption and carbon dioxide emissions are high. There is emission of volatile organic compounds. Man-made operations at sea are required. Helicopters are required to transport staff back and forth. It is greatly affected by adverse weather conditions.

For concrete gravity storage tanks, it takes a long time to install. There is sedimentation of toxic substance. Equipment disassembly is difficult and the cost of disposal is high. It is only applicable to shallow sea. It is non-removable.

For steel storage tanks, the installation time is long. The steel storage tanks without water/oil isolation membrane will accumulate emulsion layers due to water and oil mixing. When the steel storage tanks with water/oil isolation membranes are unloading oil, using the principle of oil-water displacement, it is necessary to make the seawater enter first and the oil in the membrane is squeezed out by seawater pressure. Seawater will cause corrosion on the steel inner wall leading to a high risk of internal leakage. There is sedimentation of toxic substance. The maintenance is difficult. Equipment disassembly is difficult and the cost of disposal is high. It is non-removable.

SUMMARY OF THE INVENTION

The invention provides a high-performance seafloor flexible oil storage system.

The technical scheme of the invention is realized as follows: A high-performance seafloor flexible oil storage system comprises an oil-water separator, a pressure pump and an input riser which are connected in sequence, and the input riser extends downward below the sea level.

Below the sea level, it is provided a pipeline and a plurality of flexible oil storage tanks with the same structure. Each of the flexible oil tanks is communicated with the pipeline through a control valve. The input riser is communicated with one end of the pipeline through a blocking valve and an input valve.

The other end of the pipeline is further connected in turn with an outlet booster pump, an output valve and an output riser. The output riser extends upwards above the sea level and the output riser is connected to the tanker through a cooler and an output pump.

The bottom of the flexible oil storage tank is attached with a concrete counterweight for fixing it to a seabed.

As a preferred embodiment, the pipeline is also provided with a middle stop valve located between two flexible oil storage tanks.

As another preferred embodiment, a sandbag is further connected to the bottom of the flexible oil storage tank through a flange, and the sandbag is connected to the oil-water separator through a circulation pipeline.

As another preferred embodiment, the flexible oil storage tank is a flexible and compressible tank. The tank wall is composed of an inner canister, an outer canister and an intermediate gap layer. The gap layer is composed of a plurality of isolation blocks sandwiched between the inner canister and the outer canister.

As another preferred embodiment, the flexible oil storage tank is provided with a reinforcing cap at the middle of the top and the bottom, and the upper reinforcing cap is connected with an oil filling/unloading pipe leading into the interior of the flexible oil storage tank.

As another preferred embodiment, a plurality of optical fiber strain/stress monitors are arranged on the outer surface of the outer canister. A plurality of leak detection sensors are arranged between the inner canister and the outer canister.

A data collector electrically connected with an optical fiber strain/stress monitor and a leak detection sensor is further provided on the top of the flexible oil storage tank.

As another preferred embodiment, the flexible oil storage tank and the concrete counterweight is combined through the UHMPE cable. The flexible oil storage tank and the UHWPE cable, as well as the UHWPE cable and the concrete counterweight are connected by a rotary shackle or a universal joint.

As another preferred embodiment, there are at least two UHWPE cables.

BRIEF DESCRIPTION OF DRAWINGS

These and other features and advantages of the present invention will become more readily apparent when considered in connection with the accompanying drawings, in which.

Of which: 1 oil-water separator; 2 pressure pump; 3 input riser; 4 pipeline; 5 flexible oil storage tank I; 6 flexible oil storage tank II; 7 flexible oil storage tank III; 8 flexible oil storage tank IV; 9 control valve; 10 blocking valve; 11 input valve; 12 outlet booster pump; 13 output valve; 14 output riser; 15 cooler; 16 output pump; 17 tanker; 18 concrete counterweight; 19 middle stop valve; 20 flange; 21 Sandbags; 22 Circulation pipeline; 23 Outer canister; 24 inner canister; 25 Isolation block; 26 Upper reinforcement cap; 27 Lower reinforcement cap; 28 Filling/unloading pipe; 29 Data collector; 30 UHWPE cable; 31 universal joints.

DETAILED DESCRIPTION OF THE EMBODIMENTS

The technical solutions in the embodiments of the invention are clearly and completely described in the following with reference to the accompanying drawings in the embodiments of the invention. The described embodiments are representative and not limiting Persons of ordinary skill in the art without creative efforts will be able to envision other embodiments and such shall fall within the protection scope of the invention.

Embodiment 1

Figure 1:
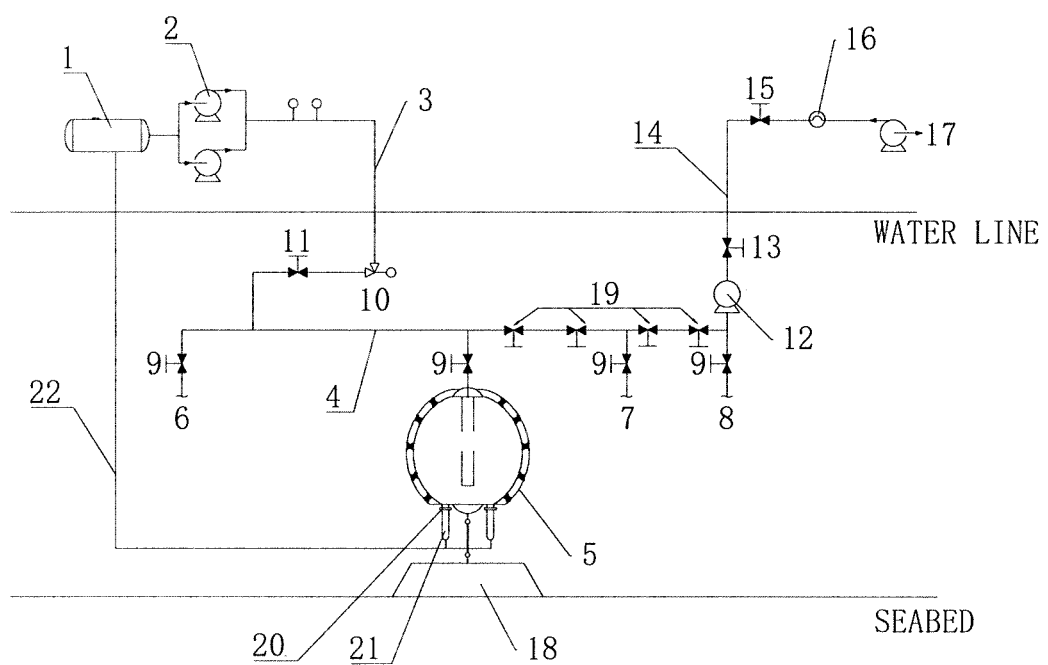
FIG. 1 is a schematic structural view of some embodiments of the invention.

As shown in FIG. 1, an embodiment of a high-performance seafloor flexible oil storage system according to the invention includes an oil-water separator 1, a pressure pump 2 and an input riser 3, which are connected in sequence. The input riser 3 extends downwards below the sea level; below the sea level there is a pipeline 4 and a plurality of flexible oil storage tanks (four as shown in the figure) with the same structure, respectively, flexible oil storage tank I 5, flexible oil storage tank II 6, flexible oil storage tank III 7 and flexible oil storage tank IV 8, and specifically only flexible oil storage tank I 5 is shown in detail, the remaining three flexible oil storage tanks are briefly described. Each flexible oil storage tank is communicated with the pipeline 4 through a control valve 9. Input riser 3 is in communication with one end of the pipeline 4 through a blocking valve 10 and an input valve 11. The other end of the pipeline 4 is in turn connected with an outlet booster pump 12, the output valve 13 and the output riser 14, the output riser 14 extends upward above sea level, the output riser 14 is connected to the tanker 17 through the cooler 15 and the output pump 16; the bottom of the flexible oil storage tank is connected with concrete counterweight 18 which fixes it to a seabed.

After the technical scheme is adopted, the advantages of the invention are that: The flexible oil storage tank of the invention adopts a compressible flexible tank body, which can make the oil filling and oil unloading operation, the replacement and maintenance of the tank body, the transportation and the operation of inspection and the maintenance are more convenient. During Oiling, the crude oil goes through the oil-water separator, pressure pump and the input riser to enter the pipeline, finally goes through the control valve to get into the flexible oil storage tank, and thus achieve the oiling. When the unloading is needed, the blocking valve and the input valve can be closed, and the crude oil in the flexible oil storage tank enters the output riser through the control valve, the pipeline and the outlet booster pump and the like and finally passes through the cooler and the output pump to the tanker to realize oil unloading.

On the pipeline 4 there is also a middle stop valve 19 between two flexible oil storage tanks. When the middle stop valve 19 is closed, the flexible oil storage tank on one side can be used for oil filing and the flexible oil storage tank on the other side can be used for unloading, thus achieving the purpose of performing oil filing and unloading at the same time to greatly improve the efficiency of operations. For example, as shown in the figure, after the middle stop valve 19 is closed, flexible oil storage tank I 5 and flexible oil storage tank II 6 can be used for oil filing, while flexible oil storage tank III 7 and flexible oil storage tank IV 8 can be used for unloading.

Since the crude oil extracted is an oil-water mixture, the water deposited on the bottom after standing still needs to be drained. In order to make the water quality discharge in the flexible oil storage tank reach standard, the bottom of the flexible oil storage tank is also connected with the sandbags 21 through the flange 20, the sandbags 21 are connected to the oil-water separator 1 through the circulation pipeline 22, so that the sand and gravel in the water can be filtered out, then the water is sent to the oil-water separator 1 through the circulation pipeline 22 for treatment, so that the water quality discharge in the flexible oil storage tank reaches the standard.

Figure 2:
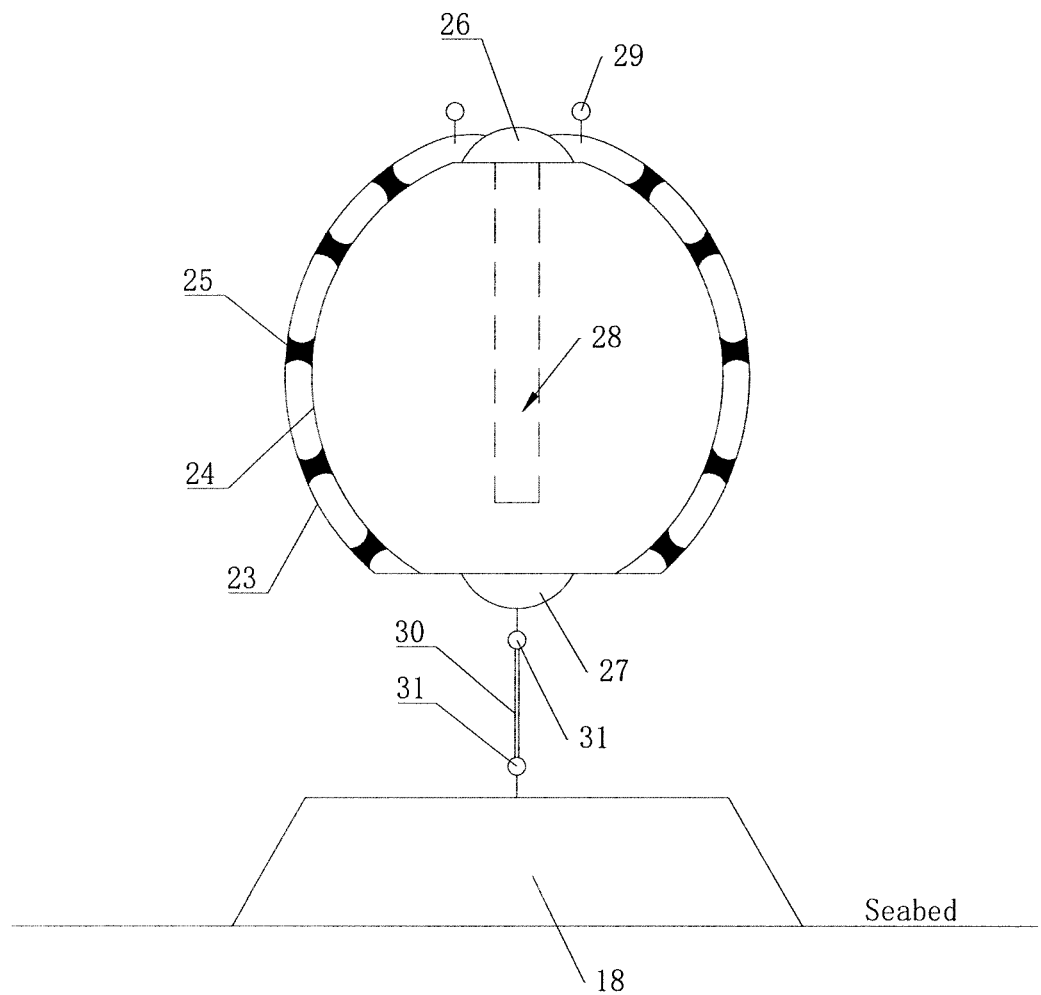
FIG. 2 is a schematic view of the structure of the flexible oil storage tank in these embodiments.

FIG. 2, shows a structural schematic diagram of a single flexible oil storage tank. The entire flexible oil storage tank is a compressible flexible tank, which enables oil filling and unloading operations, tank replacement and maintenance, transportation and the operation of inspection and the maintenance more convenient and can take the shape of a sphere, a cylinder, a cuboid, a cube, an ellipsoid or any other shape. The wall of the tank comprises an inner canister 24, an outer canister 23 and an intermediate gap layer. The gap layer is composed of a plurality of isolation blocks 25 sandwiched between the inner canister 24 and the outer canister 23. The inner canister 24 and the outer canister 23 provide double-layer protection against liquid leakage in the flexible oil storage tank. The inner canister 24 and the outer canister 23 are made of a composite reinforced non-metallic material. The inner canister 24 is used for containing fluid in the flexible oil storage tank, such as crude oil or chemical medium. The outer tank 23 is used to withstand external impact loads, such as impacts from anchors, as well as scratches, microbial intrusion and seawater corrosion. The gap layer is a layer of insulating layer and heating layer to ensure that the temperature inside the flexible oil storage tank can always keep the crude oil in a liquid state.

In the middle of the top and bottom of the flexible oil storage tank, reinforcement caps, that is, an upper reinforcement cap 26 and a lower reinforcement cap 27, are provided to prevent localized stress and strain concentration in the flexible oil storage tank. The upper reinforcement cap 26 is connected with an oil filling/unloading pipe 28. A plurality of optical fiber strain/stress monitors are attached on the outer surface of the outer canister 23 for monitoring the strain and stress of the flexible oil storage tank in real time to ensure that it is in a normal working condition. A plurality of leak detection sensors is disposed between the inner canister 24 and the outer canister 23 to detect the presence of a leak in the flexible oil storage tank by detecting conditions in the gap layer. A data collector 29, electrically connected with the strain/stress monitor and leak detection sensor, is provided on the top of the flexible oil storage tank.

Finally, the flexible oil storage tank and the concrete counterweight 18 are connected by the UHWPE cable 30. The flexible oil storage tank and the UHWPE cable 30, as well as the UHWPE cable 30 and the concrete counterweight 18 are both connected with rotated shackle or universal joints 31, to realize the quick installation and removal of the flexible oil storage tank. In order to ensure the normal operation of the flexible oil storage tank, there are at least two UHWPE cables 30 in the embodiment, and in the case that one cable was broken normal operation can be continued.

The high-performance seafloor flexible oil storage system of the invention has the advantages of simple structure, convenient maintenance and good practicability.

The above descriptions are merely preferred embodiments of the invention, and are not intended to limit the invention. Any modification, equivalent replacement and improvement within the spirit and principle of the invention should be included in the protection scope of the invention.

The invention claimed is:

1. A high-performance seafloor flexible oil storage system comprising:
- an oil-water separator, a pressure pump and an input riser connected in sequence, wherein the input riser is extendible downward below the sea level;
- wherein the system further comprises a plurality of flexible oil storage tanks with the same structure, and a control valve, the control valve fluidly coupling the plurality of oil storage tanks with a pipeline;
- wherein the input riser communicates with one end of the pipeline through a blocking valve and an input valve of the system;
- wherein an opposite end of the pipeline is further connected in turn with an outlet booster pump, an output valve and an output riser, the output riser being extendible upwardly above the sea level, and the output riser being connectible to an oil tanker through a cooler and an output pump of the system;
- wherein each flexible oil storage tank is provided with a reinforcing cap at a middle of a top and the bottom of each tank, and the upper reinforcing cap is connected with an oil filling/unloading pipe leading into the interior of the flexible oil storage tank;
- and wherein a concrete counterweight is provided under the plurality flexible oil storage tanks for anchoring the plurality of flexible oil storage tanks to a seabed, and wherein each flexible oil storage tank comprises a compressible flexible tank; and
- wherein the plurality of flexible oil storage tanks each has a tank wall comprising an inner flexible canister wall, an outer flexible canister wall, and an intermediate gap layer comprising a plurality of isolation blocks sandwiched between the flexible inner canister wall and the flexible outer canister wall, wherein said intermediate gap layer ensures that the temperature is maintained inside said flexible oil storage tank.

2. The high-performance seafloor flexible oil storage system according to claim 1, wherein the pipeline is further provided with a middle stop valve located between two of the plurality of flexible oil storage tanks.

3. The high-performance seafloor flexible oil storage system according to claim 1, wherein a bottom of the plurality of flexible oil storage tank is further reconnected with a sandbag through a flange, and the sandbag is reconnected to the oil-water separator through a circulation pipeline.

4. The high-performance seafloor flexible oil storage system according to claim 1, wherein a plurality of optical fiber strain/stress monitors are arranged on the outer surface of the outer canister, and a plurality of leak detection sensors are arranged between the inner canister and the outer canister, wherein the top of the flexible oil storage tank is also provided with a data collector which is electrically connected with the optical fiber strain/stress monitor and the leak detection sensor.

5. The high-performance seafloor flexible oil storage system according to claim 1, wherein the flexible oil storage tank and the concrete counterweight are connected by an ultra-high-molecular-weight polyethylene UHWPE cable, the flexible oil storage tank and the UHWPE cable, as well as the UHWPE cable and the concrete counterweight are connected by a rotary shackle or a universal joint.

6. The high-performance seafloor flexible oil storage system according to claim 5, wherein at least two UHWPE cables are provided.

* * * * *